(12) United States Patent
Bos et al.

(10) Patent No.: US 11,841,873 B2
(45) Date of Patent: Dec. 12, 2023

(54) DYNAMIC FILTER AND PROJECTION PUSH DOWN

(71) Applicant: SAP SE, Walldorf (DE)

(72) Inventors: Daniel Bos, Beijing (CN); Qing Liu, Beijing (CN); Tobias Maximilian Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 62 days.

(21) Appl. No.: 17/672,141

(22) Filed: Feb. 15, 2022

(65) Prior Publication Data

US 2023/0259519 A1 Aug. 17, 2023

(51) Int. Cl.
*G06F 16/25* (2019.01)
*G06F 16/11* (2019.01)

(52) U.S. Cl.
CPC .......... *G06F 16/254* (2019.01); *G06F 16/116* (2019.01); *G06F 16/258* (2019.01)

(58) Field of Classification Search
CPC ..... G06F 16/254; G06F 16/258; G06F 16/116
USPC ....................................................... 707/602
See application file for complete search history.

(56) References Cited

U.S. PATENT DOCUMENTS

| | | | | |
|---|---|---|---|---|
| 2012/0117341 | A1* | 5/2012 | Amit | G06F 16/116 711/159 |
| 2012/0158999 | A1* | 6/2012 | Yoo | H04L 69/24 709/246 |
| 2015/0254330 | A1* | 9/2015 | Chan | G06F 16/273 707/613 |
| 2015/0370870 | A1* | 12/2015 | Caruana | H04L 67/63 707/602 |
| 2018/0011905 | A1* | 1/2018 | Liu | G06F 16/21 |
| 2020/0250154 | A1* | 8/2020 | Bagga | G06F 16/951 |
| 2021/0141838 | A1* | 5/2021 | Atallah | G06F 16/9577 |
| 2021/0326368 | A1* | 10/2021 | Binjrajka | G06Q 10/0633 |

\* cited by examiner

*Primary Examiner* — Mohammad S Rostami
*Assistant Examiner* — Saba Ahmed
(74) *Attorney, Agent, or Firm* — SCHWEGMAN LUNDBERG & WOESSNER, P.A.

(57) ABSTRACT

Data sources provide access to data. The data stored by the data source may be transformed before use by an application. Different data sources support different transformations. A data agent sidecar for the application accepts work orders from the application and submits work orders to data sources. A work order identifies a data source from which data is requested. The work order optionally includes one or more transformations to be applied to the data from the data source. The data agent sidecar determines, for the data source from which data is requested, which transformations can be performed by the data source and which transformations are not supported by the data source. The data transformations that can be performed by the data source are included in the work order to the data source. The remaining data transformations are performed by the data agent sidecar.

20 Claims, 8 Drawing Sheets

DYNAMIC FILTER AND PROJECTION PUSH DOWN

TECHNICAL FIELD

The subject matter disclosed herein generally relates to data access. Specifically, the present disclosure addresses systems and methods for dynamic filter and projection push down in the access of data sources.

BACKGROUND

Applications request data from data sources. The received data may be processed by the application, using filters, projections, or both. Data from multiple data sources may be combined by the application. Different types of data sources (e.g., databases and file systems) may have different interfaces and capabilities.

DETAILED DESCRIPTION

Figure 1:
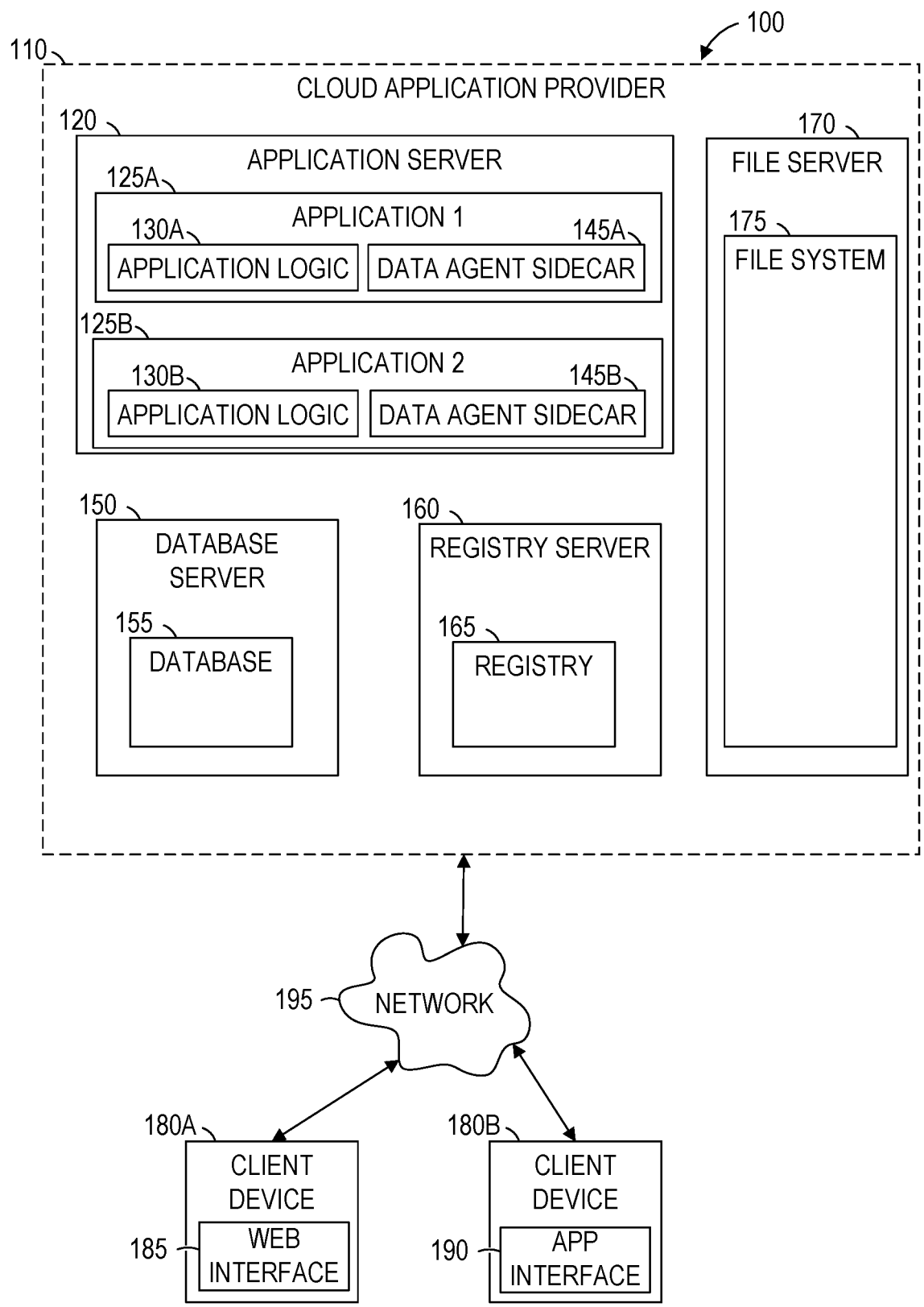
FIG. 1 is a network diagram illustrating an example network environment suitable for dynamic filter and projection pushdown in accessing data.

Data sources provide access to data. The data stored by the data source may be transformed before use by an application. For example, a database may store all transactions by all users, but an application may filter the data by using only the transactions by a specific user, only the transactions in a specified date range, only the transactions for a specific product, or any suitable combination thereof. As another example, the application may apply a projection to the data by summing the transaction value for a set of transactions and using the total transaction value.

The term "transformation," as used herein, is an umbrella term that encompasses filters, projections, and aggregations. Data used by an application in the same form as it is stored by a data source is not transformed. Data that is transformed is used by an application in a different form than it is stored.

Different data sources support different transformations. For example, a database supports many forms of filtering, projection, and aggregation. However, a basic file system may support only retrieving files by name. Accordingly, when accessing data from the basic file system, transformations to the data contained in files is performed by the accessing application, not by the data source.

A filter is a transformation that reduces the responsive data based on a condition, but does not alter the data itself. For example, request for data from a database table may include a filter that causes only rows with a creation date in a specified year to be returned. A projection is a transformation that modifies the responsive data by acting on individual records. For example, a request for columns A, C, and D from a database table may include a transformation that changes the order of the returned columns to C, D, and A. As another example, column names may be changed, or functions may be applied to individual columns. For example, a fixed value may be added to the value in a column or a value of a second column may be added to a value of a first column and returned as the value of the first column.

An aggregation is a transformation that combines multiple records into a single record. For example, returning the number of sales record per month by grouping the original (daily or transactional sales data) by month and aggregating the records of each month into a single record containing a new "count" field. Other functions can be applied as well during the aggregation, such as calculating the sum, minimum, maximum, average, or any suitable combination thereof.

As described herein, a data agent sidecar (e.g., a library, module, or co-executing application) for each application accepts work orders from the application and submits work orders to data sources. A work order identifies a data source from which data is requested and optionally includes one or more transformations to be applied to the data from the data source.

The data agent sidecar determines, for the data source from which data is requested, which transformations can be performed by the data source and which transformations are not supported by the data source. The data transformations that can be performed by the data source are included in the work order to the data source. The remaining data transformations are performed by the data agent sidecar.

Since the data agent sidecar uses dynamic filter and projection pushdown, the application receives the requested data, transformed as requested. Furthermore, the transformations that can be performed in the data source are performed in the data source, which may reduce network traffic, processor consumption, or both. Additionally, the application is enabled to apply any data transformation supported by the data agent sidecar to any data source, even if the data source does not itself support the data transformation. Accordingly, efforts involved in application development and maintenance are reduced, including computing resources used in those efforts.

FIG. 1 is a network diagram illustrating an example network environment 100 suitable for dynamic filter and projection pushdown in accessing data. The network environment 100 includes a cloud application provider 110, client devices 180A and 180B, and a network 195. The cloud application provider 110 provides applications 125A and 125B using application server 120. The applications 125A-125B (and other applications) may be dynamically allocated among the application server 120 and other application servers. Each application 125 includes application logic and a data agent sidecar, denoted in FIG. 1 with reference numbers 130A-130B and 145A-145B, respectively. The cloud application provider also uses a database server 150 that provides access to a database 155, a registry server 160 that provides access to a registry 165, and a file server 170 that provides access to a file system 175. The applications 125A-125B interact with the client devices 180A and 180B via a web interface 185 or an application interface 190.

The application server 120, the database server 150, the registry server 160, the file server 170, and the client devices 180A and 180B may each be implemented in a computer system, in whole or in part, as described below with respect to FIG. 8. Like elements denoted with alphabetic suffixes may be referenced collectively or generically using the numeric reference without a suffix. For example, the client devices 180A and 180B may be referred to collectively as client devices 180 or generically as a client device 180.

The application logic 130 of each application 125 provides application-specific instructions to the application server 120. For example, a report-generating application may receive user selections of data to be included in a report, access data from a database, process the data to generate the report, and cause a user interface to be presented on a client device 180. In this example, the user interface includes the report. The data agent sidecar 145 of each application 125 provides data access functionality. Thus, the creator of each application 125 does not need to recreate the data access functionality, but instead integrates that functionality through use of the data agent sidecar 145.

The data agent sidecars 145A-145B receive work orders (e.g., via function calls) from the application logic 130A-130D. Each work order identifies a data source. The work orders may also identify one or more data transformations to be applied to data from the data source. In response to receiving a work order, the data agent sidecar 145 generates a work order for a data source (e.g., the database 155 or the file system 175).

The data agent sidecar 145 may access the capabilities of the data source from the registry 165. For example, the database server 150 may add capability information to the registry 165 that indicates that the database 155 can filter results by column and perform certain projections (e.g., summing values in a column for all rows responsive to the query). As another example, the file server 170 may add capability information to the registry 165 that indicates that the file system 175 can filter files by name, or using wildcards, but cannot operate on data within files.

The cloud application provider 110 may be a multi-tenant application provider, such that multiple tenants (also referred to as customers) are associated with the applications 125. For example, the applications 125A may be associated with a first tenant and the application 125B may be associated with a third tenant. Each of the applications 125 may be accessible only by user accounts associated with the tenant for the application 125.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 150, the registry server 160, the file server 170, and the client devices 180 are connected by the network 195. The network 195 may be any network that enables communication between or among machines, databases, and devices. Accordingly, the network 195 may be a wired network, a wireless network (e.g., a mobile or cellular network), or any suitable combination thereof. The network 195 may include one or more portions that constitute a private network, a public network (e.g., the Internet), or any suitable combination thereof.

Figure 2:
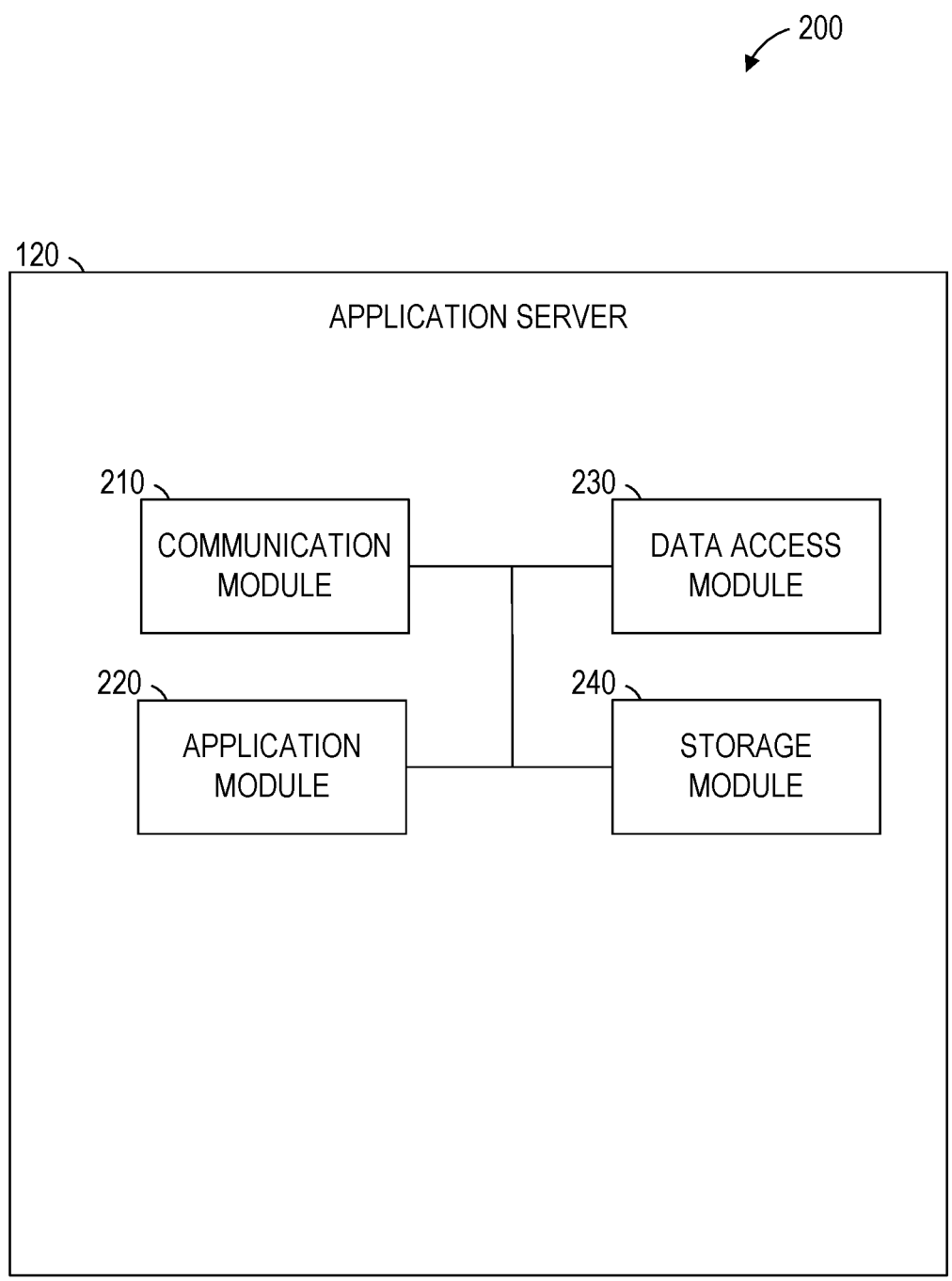
FIG. 2 is a block diagram of an example application server suitable for providing an application that makes use of dynamic filter and projection pushdown.

FIG. 2 is a block diagram of an example application server 120 of FIG. 1 suitable for providing an application that makes use of dynamic filter and projection pushdown. The application server 120 is shown as including a communication module 210, an application module 220, a data access module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the application server 120 and transmits data from the application server 120. For example, the communication module 210 may receive, from the client device 180A or 180B of FIG. 1, a request for a report to be generated by accessing one or more data sources. Communications sent and received by the communication module 210 may be intermediated by the network 195.

The application module 220 provides the application 125A or 125B of FIG. 1, which may be any application that accesses data. The data access module 230 implements the data agent sidecar 145A or 145B of FIG. 1, receiving data access requests from the application 125, sending work orders to data sources (e.g., the file system 175 or the database 155), receiving data in response to the work orders, performing transformations on the received data, and providing the transformed data to the requesting application 125.

The storage module 240 may store data locally in the application server 120 for the applications 125 (e.g., in a hard drive, solid state drive (SSD), random access memory (RAM), or any suitable combination thereof), store data remotely (e.g., in a network attached storage (NAS) device, database server, or any suitable combination thereof), or any suitable combination thereof. The stored data may include data received by the data access module 230 from one or more data sources (e.g., data that is being processed for an application 125), registry data from the registry 165 that is being cached to reduce the number of registry accesses, or any suitable combination thereof.

Figure 3:
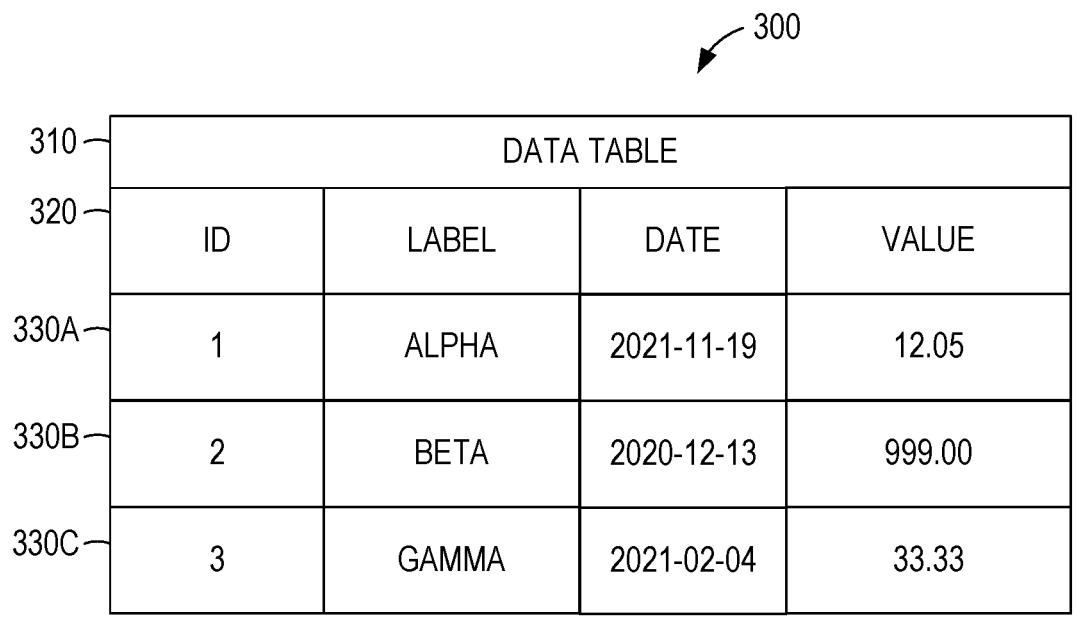
FIG. 3 is a block diagram of an example database schema suitable for access by a system that makes use of dynamic filter and projection pushdown.

FIG. 3 is a block diagram of an example database schema 300 suitable for access by a system that makes use of dynamic filter and projection pushdown. The database schema 300 includes a data table 310. The data table 310 includes rows 330A, 330B, and 330C in a format 320.

Each row of the data table 310 stores an identifier, a label, a date, and a value. The identifier may be an identifier of a customer, a system, a device, or another identifier associated with the row. The label may be a string associated with the row. The date may be a date or date/time stamp that identifies the date on which the row was created or another date for the data of the row. The value may be a counter, a dollar value, or other numerical value associated with the row.

The database server 150 of FIG. 1 may be enabled to perform various transformations on the data stored in the data table 310. For example, the structured query language (SQL) query "SELECT * from data_table" may be processed by the database server 150 to provide all data stored in the data table 310. As another example, the query "SELECT ID from data_table" may cause the database server 150 to provide only the identifiers in the data table 310. As still another example, the query "SELECT label from data_table where date> '1/1/2021'" may cause the database server to provide only the identifiers for the rows in the data table 310 that have date values of Jan. 1, 2021 or later. These latter two examples are examples of filters, in which a subset of the available data is provided by the data source.

Projections may also be performed by the database server 150. For example, the query "SELECT COUNT(ID) from data_table" may cause the data server 150 to provide the number of rows in the data table 310 even though the number of rows is not stored in the table itself. As another example, the query "SELECT SUM(value) from data_table" may cause the data server to provide the sum of all of the value fields in the data table 310.

Figure 4:
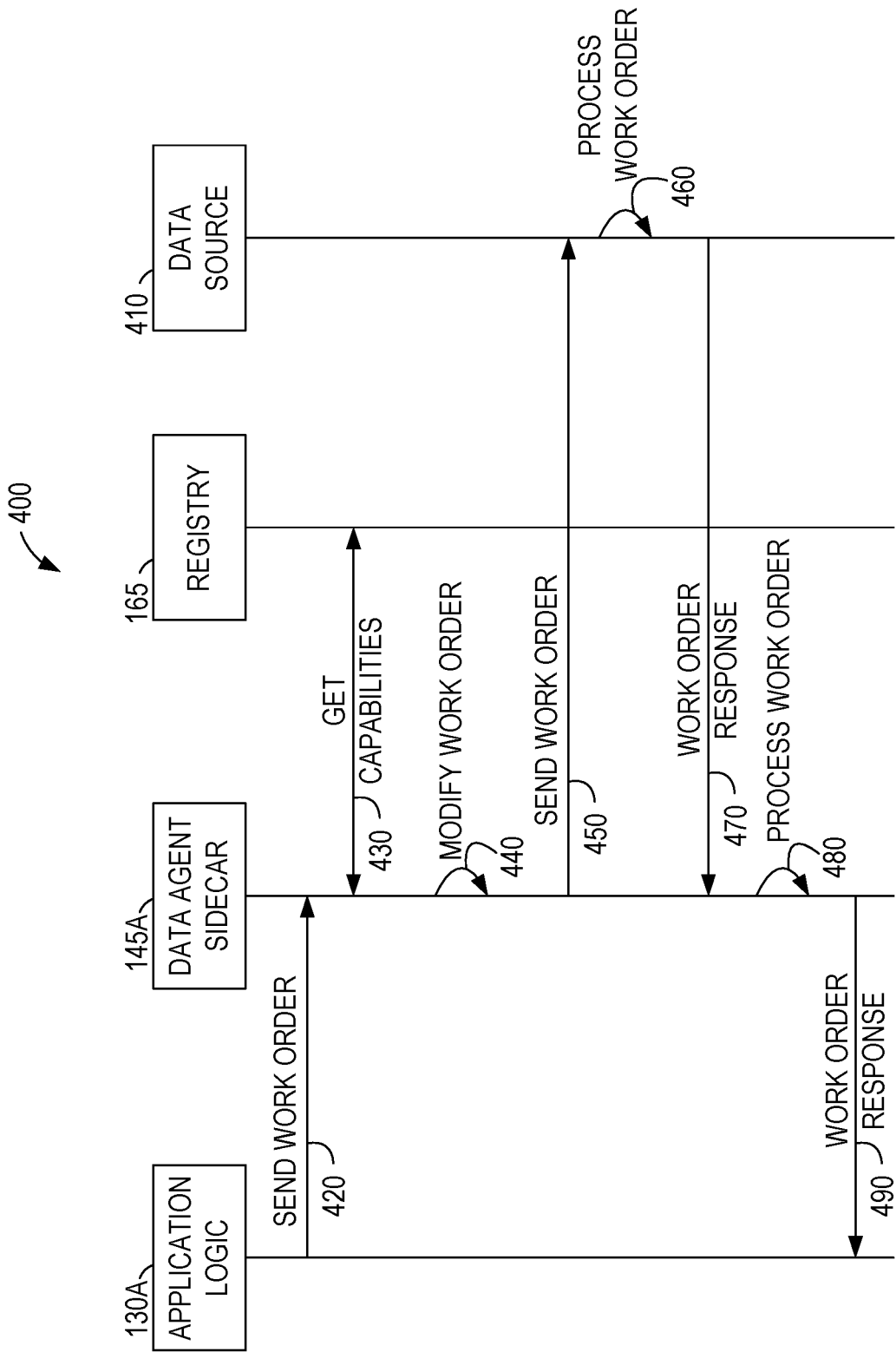
FIG. 4 is a swimlane diagram showing communications between application logic, a data agent sidecar, a registry, and a data source in using dynamic filter and projection pushdown.

FIG. 4 is a swimlane diagram 400 showing communications between the application logic 130A, the data agent sidecar 145A, the registry 165, and a data source 410 in using dynamic filter and projection pushdown. The swimlane diagram 400 includes communications 420, 430, 450, 470, and 490; and operations 440, 460, and 480.

The application logic 130A sends the communication 420, including a work order, to the data agent sidecar 145A. The communication 420 may be sent using a function call, an inter-process communication, a remote procedure call, a representational state transfer (REST) application programming interface (API), or any suitable combination thereof. The work order identifies a data source and includes one or more transformation requests for transformations to be applied to data provided by the data source. The work order may be in a JavaScript Object Notation (JSON) format, as in the example below.

```
{
  "type": "transfer",
  "source": {
    "type": "database",
    "connection": {
      "host": "localhost",
      "port": 1234,
      "user": "...",
      "password": "..."
    },
    "container": "user_schema_1",
    "object": "table_1"
  },
  "transform": {
    "filter": {
      "type": "binary_operation",
      "name": "=",
      "args": [
```

-continued

```
      { "type": "column", "name": "year" },
      { "type": "number", "value": 2021 }
    ]
  },
  "projection": [
    {
      "type": "function",
      "name": "convert",
      "args": [
        { "type": "datatype", "name": "string" },
        { "type: "column", "name": "C" }
      ],
      "alias": "C"
    },
    { "type": "column", "name": "D" },
    { "type": "column", "name": "A", "alias": "E" }
  ]
  },
  "target": {
    "type": "datalake",
    "connection": {
      "host": "remote",
      "port": 4242,
      "certificate": "..."
    },
    "container": "/path/to/target",
    "object": "file_1"
  }
}
```

In the example above, the "source" section identifies the data source, the "transform" section identifies the requested transformations to be applied to data from the data source, and the "target" section identifies the recipient of the data. In this example, the data source is table_1 of user_schema_1 of a database accessed from the system "localhost" using port 1234. The data is filtered so that only rows from table_1 having a "year" value of "2021" are received. Additionally, the data of column "C" is converted to type "string," and data of column "A" is returned as though the name of the column were "E." The data will be sent to "file_1" at the path "/path/to/target" on the system "remote" via port 4242.

In response to receiving the communication 420, the data agent sidecar 145A communicates, in communication 430, with the registry 165 to get transformation capabilities of the identified data source. For example, the data agent sidecar 145A may send a request comprising an identifier of the data source (e.g., some or all of the data contained in the "source" section of the work order received from the application logic 130A) and receive a response that identifies the capabilities of the data source. The received capability data may be cached by the data agent sidecar 145A, such that future work orders from the application logic 130A do not result in repetition of the communication 430.

Based on the received work order and the identified capabilities of the data source, the data agent sidecar 145A, in operation 440, modifies the work order to include only transformation requests for transformations supported by the data source. For example, requests for supported transformations may be moved to the "source" portion of the work order and the requests for unsupported transformations left in the "transformation" portion of the work order. In the example below, the data source supports filtering on column values, but not converting data types.

```
{
  "type": "transfer",
  "source": {
    "type": "database",
```

-continued

```
    "connection": {
      "host": "localhost",
      "port": 1234,
      "user": "...",
      "password": "..."
    },
    "container": "user_schema_1",
    "object": "table_1"
    "transform": {
      "filter": {
        "type": "binary_operation",
        "name": "=",
        "args": [
          { "type": "column", "name": "year" },
          { "type": "number", "value": 2021 }
        ]
      },
      "projection": [
        {
          { "type: "column", "name": "C" },
          { "type: "column", "name": "D" },
          { "type: "column", "name": "A", "alias": "E" }
        ]
      },
    },
    "transform": {
      "projection": [
        {
          "type": "function",
          "name": "convert",
          "args": [
            { "type": "datatype", "name": "string" },
            { "type: "column", "name": "C" }
          ],
          "alias": "C"
        },
        { "type": "column", "name": "D" },
        { "type": "column", "name": "E" }
      ]
    },
    "target": {
      "type": "datalake",
      "connection": {
        "host": "remote",
        "port": 4242,
        "certificate": "..."
      },
      "container": "/path/to/target",
      "object": "file_1"
    }
  }
```

In communication 450, the data agent sidecar 145A sends the modified work order to the data source 410 (e.g., the database server 150). The data source 410 receives the work order and, in operation 460, processes the work order. Processing the work order includes accessing the data and apply the filters and projections included in the "source" portion of the work order.

The data source 410 sends communication 470 to the data agent sidecar 145A, including the requested data, transformed according to the transformations requested in the "source" portion of the work order. After receiving the responsive data, the data agent sidecar 145A performs any transformations that were not supported by the data source 410 (operation 480). In the example above, the data agent sidecar 145A converts the data of column "C" to string format.

The data agent sidecar 145A, in communication 490, sends the work order response to the application logic 130A or to the destination identified in the "target" section of the work order. In this way, all transformations identified in the work order are applied to the data without the application logic 130A determining which transformations are to be performed by the data agent sidecar 145A and which are to be performed by the data source 410. This enables new types of data sources, with different transformation support, to be used by the application 125A without modification of the application logic 130A. Additionally, this allows for centralized control of dynamic shifting of priorities of computation and network resources. For example, to reduce network consumption, data sources may be requested to perform all supported transformations. However, to reduce computational workload by the data sources, data agent sidecars may perform all (or selected) transformations even when those transformations are supported by data sources.

By way of example and not limitation, the data agent sidecar 145A is shown in FIG. 4 as processing a single work order. However, multiple work orders may be received in parallel or sequentially. The transformations in each work order may be divided, such that some transformations are performed by the data agent sidecar 145A and other transformations are performed by the data source 410, according to the capabilities of the data source 410.

Furthermore, by way of example and not limitation, the data agent sidecar 145A is shown in FIG. 4 as being in communication with a single data source 410. However, the work orders received from the application logic 130A may identify different data sources. The different data sources may have different capabilities. The data agent sidecar 145A determines the different capabilities of the different data sources by accessing the registry 165. Thus, work orders including the same transformation and requesting data from different data sources may result in a different division of processing between the data agent sidecar 145A and the data sources.

Figure 5:
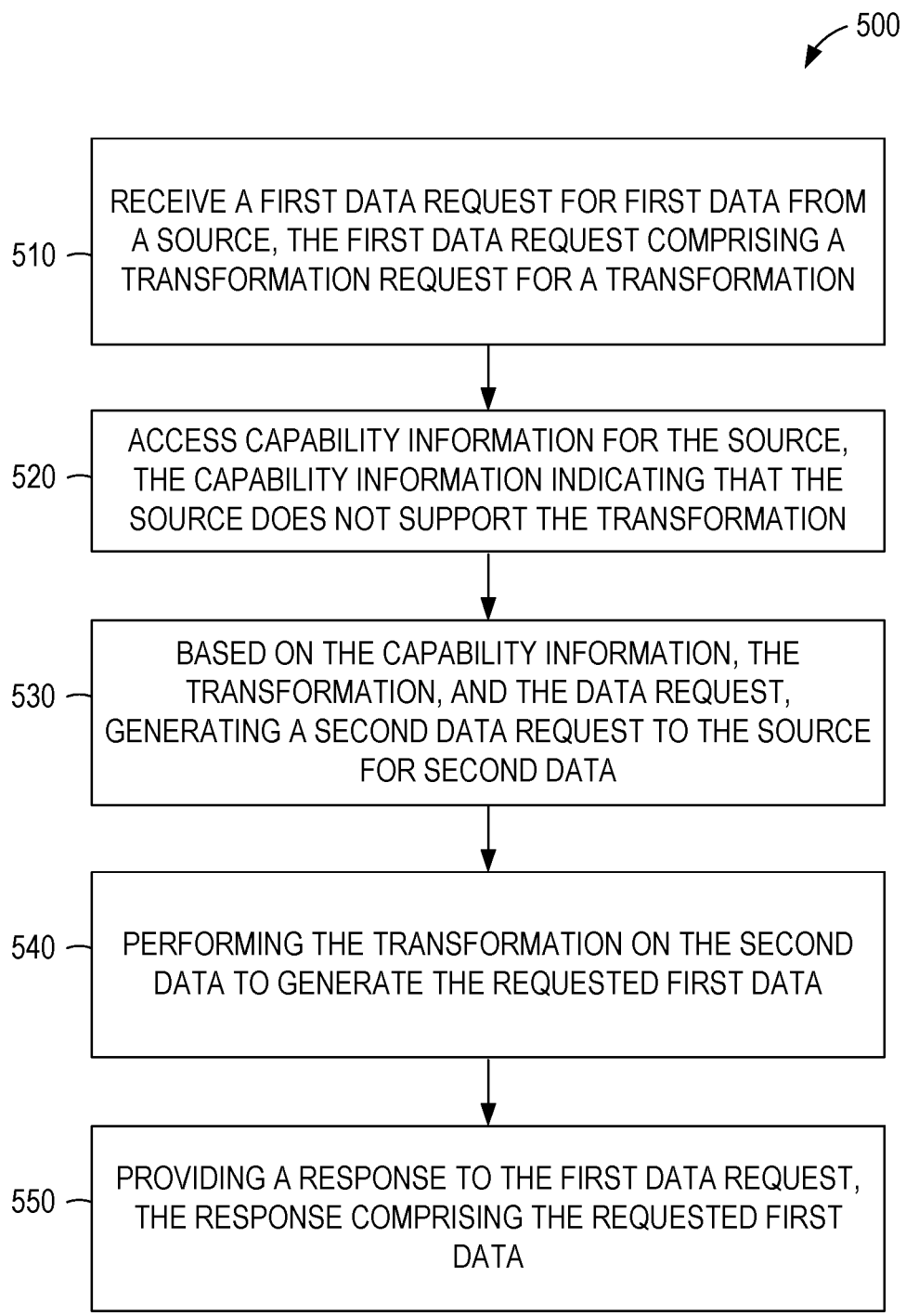
FIG. 5 is a flowchart illustrating operations of an example method suitable for dynamic filter and projection pushdown.

FIG. 5 is a flowchart illustrating operations of an example method 500 suitable for dynamic filter and projection pushdown. The method 500 includes operations 510, 520, 530, 540, and 550. By way of example and not limitation, the method 500 is described as being performed by the data access sidecar 145A of the application 125A of FIG. 1, using the modules of FIG. 2 and the swimlane diagram of FIG. 4.

In operation 510, the data access sidecar 145A of FIG. 4 receives a first data request for first data from a source, the first data request comprising a transformation request for a transformation. For example, the first data request may be received in the communication 420 of FIG. 4.

The data access sidecar 145A, in operation 520, accesses capability information for the source, the capability information indicating that the source does not support the transformation. For example, the capability information may be retrieved from the registry 165. The capability information may indicate that the source does not support filtering, converting of data types, or another transformation.

In operation 530, based on the capability information, the transformation, and the data request, the data access sidecar 145A generates a second data request to the source for second data. For example, the first data request may be for data that has been filtered and thereby has renamed columns. Thus, data complying with the transformation is the "first data" of the example method 500. The data requested from the data source is not the "first data" because the data source lacks the capability to perform at least one of the requested transformations. The second data request does not request the source to perform the unsupported transformations.

The data access sidecar 145A receives the requested second data and, in operation 540, performs the transformation on the second data to generate the requested first data. For example, if the unsupported transformation is a data type conversion, the data access sidecar 145A performs the requested data type conversion.

In operation 550, the data access sidecar 145A provides a response to the first data request, the response comprising the requested first data. Thus, the requester of the first data is enabled to receive the requested first data, which included applying a transformation to data of a data source, even though the data source did not support the transformation.

Had the capability information accessed in operation 520 instead indicated that the source does support the transformation, the second data request generated in operation 530 would include the transformation as part of the second data request. In this case, the data source would perform the transformation and operation 540 would be skipped. The response provided in operation 550 would still include the requested first data, but processing cycles and power consumption by the data access sidecar 145A would be saved, since the transformation was performed by the computing device of the data source instead. In either case, the application 125 is enabled to receive the requested data, even though the capabilities of various data sources may differ.

Figure 6:
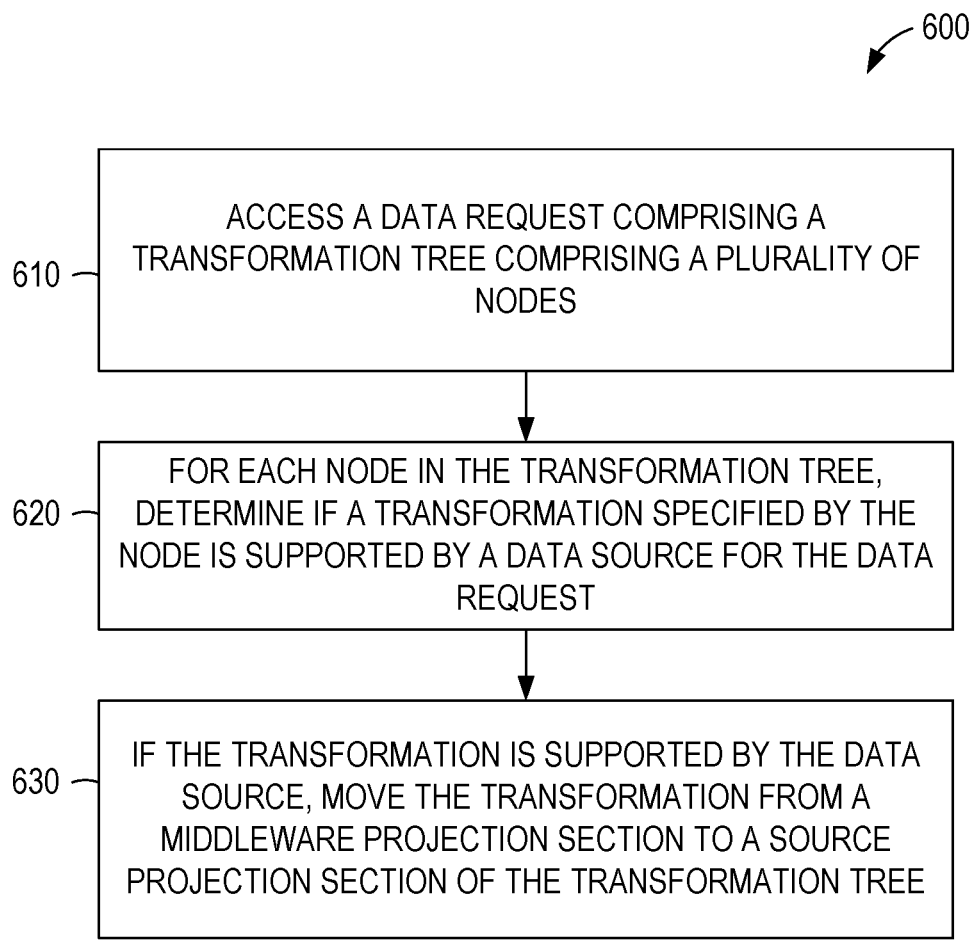
FIG. 6 is a flowchart illustrating operations of an example method suitable for dynamic filter and projection pushdown.

FIG. 6 is a flowchart illustrating operations of an example method 600 suitable for dynamic filter and projection pushdown. The method 600 includes operations 610, 620, and 630. By way of example and not limitation, the method 600 is described as being performed by the data access sidecar 145A of the application server 125 of FIG. 1, using the modules of FIG. 2 and the swimlane diagram of FIG. 4. The method 600 may be used to perform the operation 440 of FIG. 4.

In operation 610, the data access sidecar 145A of FIG. 4 accesses a data request comprising a transformation tree comprising a plurality of nodes. For example, the data request in JSON format below may be accessed.

```
{
    "type": "transfer",
    "source": {
        ...
    },
    "transform": {
        ...
        "projection": [{
            "type": "function",
            "name": "convert",
            "args": [
                { "type": "datatype", "name": "string" },
                {
                    "type": "function",
                    "name": "round",
                    "args": [{ "type": "column", "name": "X" }]
                }],
                "alias": "X"
            ]
        }]
    },
    "target": {
        ...
    }
}
```

In this data access request, the nested pairs of curly braces define a tree structure. The "transform" node is a parent of the "projection" node. The "projection" node is a parent of a child node invoking the "convert" function, which is the parent of a child node invoking the "round" function. The "convert" node changes the type of column "X" to a string. The "alias" clause causes the rounded values to be treated as if they were the original values of column "X" by later transformations or by the recipient of the data. The "round" node requests a projection that changes the value of column "X" by rounding it.

The data access sidecar 145A, in operation 620, iterates over the nodes of the transformation tree to determine, for each node in the transformation tree, if a transformation specified by the node is supported by a data source for the data request. If the transformation is supported by the data source, the data access sidecar 145A moves the transformation from a middleware projection section to a source projection section of the transformation tree. Middleware refers to software that acts as a bridge between two applications or application components. In this instance, the data access sidecar 145A is middleware that bridges the application logic 130A and the database server 150 or the file server 170. Transformations that are not supported by the data source are left in the middleware projection section. Thereafter, projections in the middleware projection section are performed by the data access sidecar 145A and the projections in the source projection section are performed by the data source. For example, if the data source supports the "round" function but not the "convert" function, the data request may be modified as shown below, with the "convert" transformation moved from the "projection" node to a "source/projection" node.

```
{
    "type": "transfer",
    "source": {
        ...
        "projection": [{
            "type": "function",
            "name": "round",
            "args": [{ "type": "column", "name": "X" }],
            "alias": "X"
        }]
    },
    "transform": {
        ...
        "projection": [{
            "type": "function",
            "name": "convert",
            "args": [
                { "type": "datatype", "name": "string" },
                { "type": "column", "name": "X" }
            ],
            "alias": "X"
        }]
    },
    "target": {
        ...
    }
}
```

As described above, operations 620 and 630 always move supported transformations from the middleware to the data source sections. However, some transformations may be performed by the middleware even if supported by the data source. For example, a data request may request columns A and B and the sum of the values in columns A and B from a data source. Since the sum of the values in A and B can be determined from the values of A and B and the data request already requests both of those values, the middleware can perform the sum operation instead of the data source to reduce network traffic.

Moving a transformation from one section of the transformation tree to another may involve adding additional nodes to the transformation tree. For example, the data request may apply a filter that returns only columns A and B when column C has a specified value. If the filter is to be applied by the middleware, column C must be requested from the data source even though the application has not requested the value of column C.

Additionally, to increase the chances of pushing down as much of a complex filter as possible, various transformations of the filter can be used, such as the Conjunctive Normal Form (CNF) that flattens a deeply nested filter condition into a conjunction of disjunctions (i.e., a set of or conditions joined together by an and condition). This allows any number of the or conditions to be performed by the source while allowing the remaining or conditions to be performed by the data access sidecar 145A. If all of the or conditions can be tested by the data source, then the and condition can be performed either by the data access sidecar 145A or the data source. For example: A and (B or (C and (D or E))) is a triply-nested condition. Applying CNF to this condition yields: A and (B or C) and (B or D or E).

In view of the herein described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: receiving, from an application, a first data request for first data from a source, the first data request comprising a transformation request for a transformation; accessing capability information for the source, the capability information indicating that the source does not support the transformation; based on the capability information, the transformation, and the first data request, generating a second data request to the source for second data; performing the transformation on the second data to generate the requested first data; and providing, to the application, a response to the first data request, the response comprising the requested first data.

In Example 2, the subject matter of Example 1 includes receiving, from the application, a third data request for third data from a second source, the third data request comprising a second transformation request for a second transformation; accessing second capability information for the second source, the second capability information indicating that the second source supports the second transformation; based on the second capability information, the second transformation, and the third data request, generating a fourth data request to the second source for the third data, the fourth data request comprising the second transformation; and providing, to the application, the requested third data.

In Example 3, the subject matter of Example 2, wherein the source is a file server and the second source is a database server.

In Example 4, the subject matter of Examples 1-3, wherein the transformation comprises a filter.

In Example 5, the subject matter of Examples 1-4, wherein the transformation comprises a projection.

In Example 6, the subject matter of Examples 1-5, wherein: the first data request comprises a second transformation request for a second transformation; the capability information indicates that the source supports the second transformation; the generating of the second data request is further based on the second transformation; and the second data request comprises a third request for the second transformation.

In Example 7, the subject matter of Examples 1-6, receiving, from the application, a third data request for third data from a second source, the third data request comprising a second transformation request for a second transformation; accessing second capability information for the second source, the second capability information indicating that the second source supports the second transformation; based on the second capability information, the second transformation, the third data request, and a determination that requesting the second source to perform the requested second transformation would increase net consumption of computing resources, generating a fourth data request to the second source for fourth data, the fourth data request not comprising a fourth transformation request for the second transformation; performing the second transformation on the fourth data to generate the requested third data; and providing, to the application, the requested third data.

Example 8 is a device comprising: a memory that stores instructions; and one or more processors configured by the instructions to perform operations comprising: receiving, from an application, a first data request for first data from a source, the first data request comprising a transformation request for a transformation; accessing capability information for the source, the capability information indicating that the source does not support the transformation; based on the capability information, the transformation, and the first data request, generating a second data request to the source for second data; performing the transformation on the second data to generate the requested first data; and providing, to the application, a response to the first data request, the response comprising the requested first data.

In Example 9, the subject matter of Example 8, wherein the operations further comprise: receiving, from the application, a third data request for third data from a second source, the third data request comprising a second transformation request for a second transformation; accessing second capability information for the second source, the second capability information indicating that the second source supports the second transformation; based on the second capability information, the second transformation, and the third data request, generating a fourth data request to the second source for the third data, the fourth data request comprising the second transformation; and providing, to the application, the requested third data.

In Example 10, the subject matter of Example 9, wherein the source is a file server and the second source is a database server.

In Example 11, the subject matter of Examples 8-10, wherein the transformation comprises a filter.

In Example 12, the subject matter of Examples 8-11, wherein the transformation comprises a projection.

In Example 13, the subject matter of Examples 8-12, wherein: the first data request comprises a second transformation request for a second transformation; the capability information indicates that the source supports the second transformation; the generating of the second data request is further based on the second transformation; and the second data request comprises the second transformation.

In Example 14, the subject matter of Examples 8-13, wherein the operations further comprise: receiving, from the application, a third data request for third data from a second source, the third data request comprising a second transformation request for a second transformation; accessing second capability information for the second source, the second capability information indicating that the second source supports the second transformation; based on the second capability information, the second transformation, the third data request, and a determination that requesting the second source to perform the second transformation would increase net consumption of computing resources, generating a fourth data request to the second source for fourth data, the fourth data request not comprising the second transformation; performing the second transformation on the fourth data to generate the requested third data; and providing, to the application, the requested third data.

Example 15 is a non-transitory computer-readable medium that stores instructions that, when executed by one or more processors of a device, cause the one or more processors to perform operations comprising: receiving, from an application, a first data request for first data from a source, the first data request comprising a transformation request for a transformation; accessing capability information for the source, the capability information indicating that the source does not support the transformation; based on the capability information, the transformation, and the first data request, generating a second data request to the source for second data; performing the transformation on the second data to generate the requested first data; and providing, to the application, a response to the first data request, the response comprising the requested first data.

In Example 16, the subject matter of Example 15, wherein the operations further comprise: receiving, from the application, a third data request for third data from a second source, the third data request comprising a second transformation request for a second transformation; accessing second capability information for the second source, the second capability information indicating that the second source supports the second transformation; based on the second capability information, the second transformation, and the third data request, generating a fourth data request to the second source for the third data, the fourth data request comprising the second transformation; and providing, to the application, the requested third data.

In Example 17, the subject matter of Examples 15-16, wherein the transformation comprises a filter.

In Example 18, the subject matter of Examples 15-17, wherein the transformation comprises a projection.

In Example 19, the subject matter of Examples 15-18, wherein: the first data request comprises a second transformation request for a second transformation; the capability information indicates that the source supports the second transformation; the generating of the second data request is further based on the second transformation; and the second data request comprises the second transformation.

In Example 20, the subject matter of Examples 15-19, wherein the operations further comprise: receiving, from the application, a third data request for third data from a second source, the third data request comprising a second transformation request for a second transformation; accessing second capability information for the second source, the second capability information indicating that the second source supports the second transformation; based on the second capability information, the second transformation, the third data request, and a determination that requesting the second source to perform the second transformation would increase net consumption of computing resources, generating a fourth data request to the second source for fourth data, the fourth data request not comprising the second transformation; performing the second transformation on the fourth data to generate the requested third data; and providing, to the application, the requested third data.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
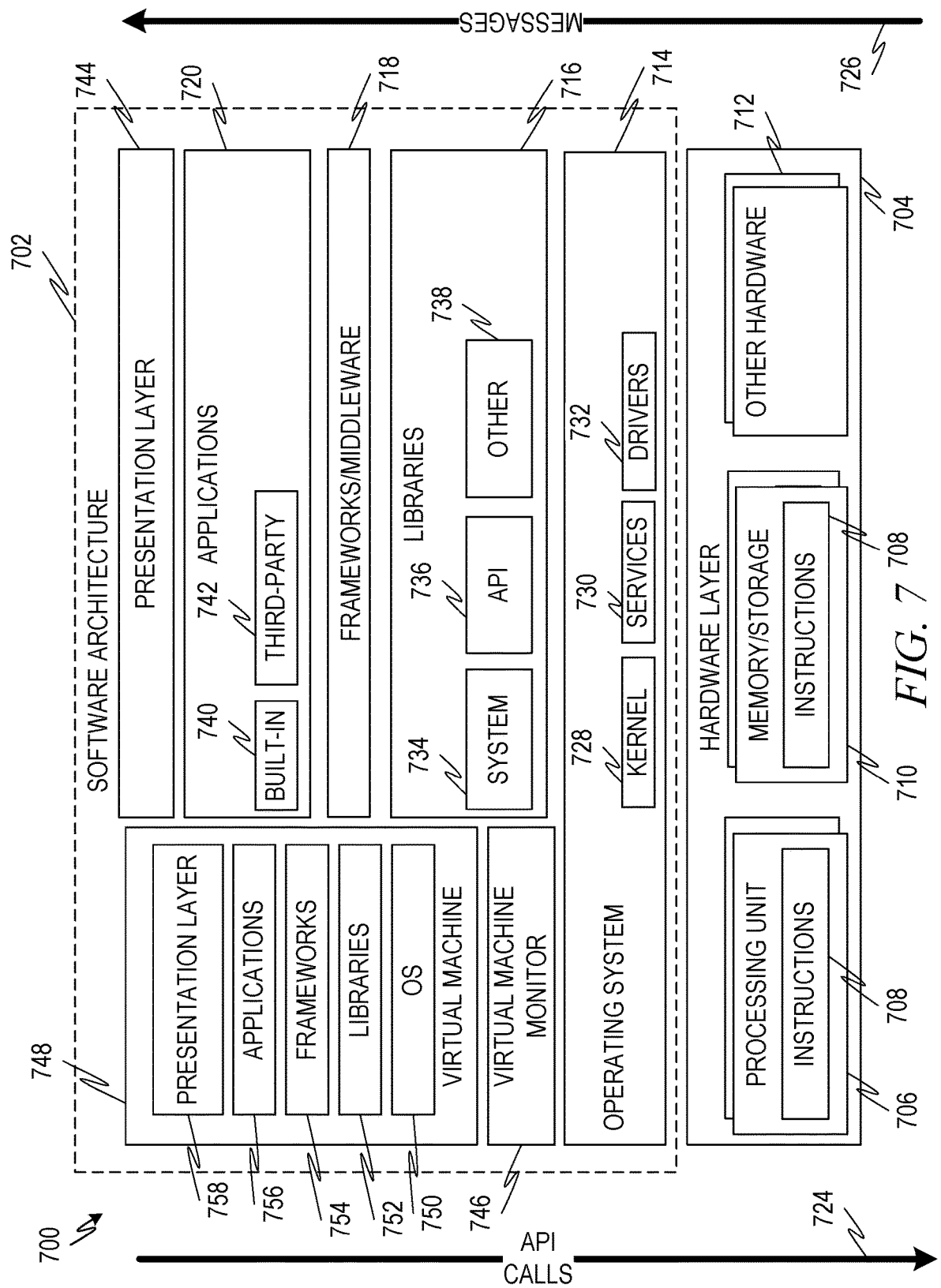
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture, and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 7.

The representative hardware layer 704 comprises one or more processing units 706 having associated executable instructions 708. Executable instructions 708 represent the executable instructions of the software architecture 702, including implementation of the methods, modules, subsystems, components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the software architecture 702.

In the example architecture of FIG. 7, the software architecture 702 may be conceptualized as a stack of layers where each layer provides a particular functionality. For example, the software architecture 702 may include layers such as an operating system 714, libraries 716, frameworks/middleware 718, applications 720, and presentation layer 744. Operationally, the applications 720 and/or other components within the layers may invoke application programming interface (API) calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on.

The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 may provide a higher-level common infrastructure that may be utilized by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™ Windows® Phone, or other mobile computing device operating systems. In this example, the third-party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system libraries 734, API libraries 736, and other libraries 738), frameworks/middleware 718 to create user interfaces to interact with users of the system. Alternatively or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of the operations may be distributed among the one or more processors, not only residing within a single machine, but deployed across several machines. The processor or processors may be in a single location (e.g., within a home environment, an office environment, or a server farm), or the processors may be distributed across several locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages; and, it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 8:
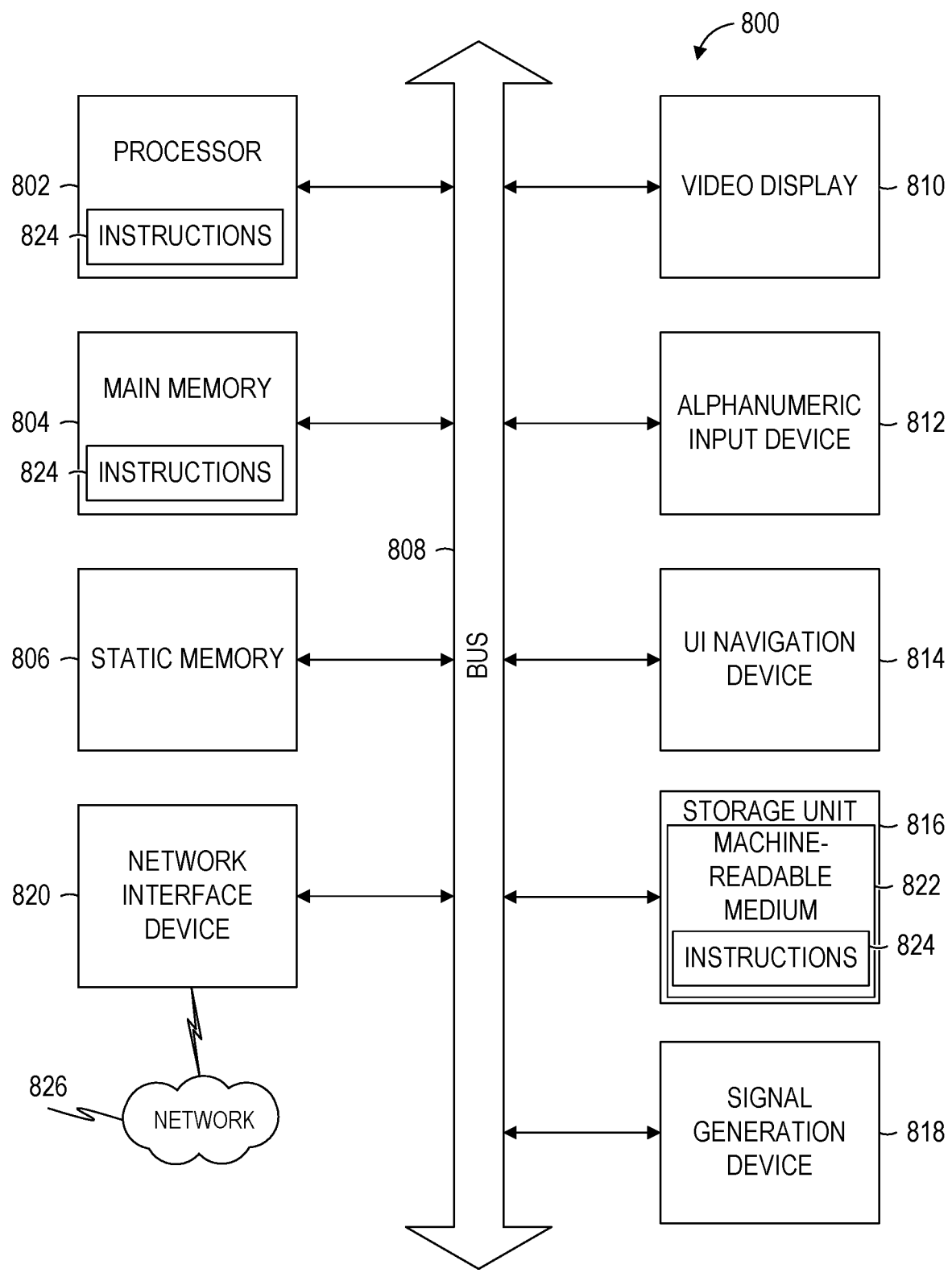
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a storage unit 816, a signal generation device 818 (e.g., a speaker), and a network interface device 820.

Machine-Readable Medium

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in FIG. 8 to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 824 may further be transmitted or received over a communications network 826 using a transmission medium. The instructions 824 may be transmitted using the network interface device 820 and any one of several well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, by one or more processors and from an application, a first data request for first data from a first source, the first data request comprising a transformation request for a first transformation;
   accessing, by the one or more processors, first capability information for the first source, the first capability information indicating that the first source does not support the first transformation;
   based on the first capability information, the first transformation, and the first data request, generating a second data request to the first source for second data;
   receiving, via a network and in response to the second data request, the second data;
   performing, by the one or more processors, the first transformation on the second data to generate the requested first data;
   providing, to the application, a response to the first data request, the response comprising the requested first data;
   receiving, from the application, a third data request for third data from a second source, the third data request comprising a second transformation request for a second transformation;
   accessing second capability information for the second source, the second capability information indicating that the second source supports the second transformation;
   based on the second capability information, the second transformation, the third data request, and a determination that requesting the second source to perform the requested second transformation would increase net consumption of computing resources, generating a fourth data request to the second source for fourth data, the fourth data request not comprising a fourth transformation request for the second transformation;
   receiving, via the network and in response to the fourth data request, the fourth data;
   performing the second transformation on the fourth data to generate the requested third data; and
   providing, to the application, the requested third data.

2. The method of claim 1, further comprising:
receiving, from the application, a fifth data request for fifth data from a third source, the fifth data request comprising a third transformation request for a third transformation;
accessing third capability information for the third source, the third capability information indicating that the third source supports the third transformation;
based on the third capability information, the third transformation, and the fifth data request, generating a sixth data request to the third source for the fifth data, the sixth data request comprising the third transformation; and
providing, to the application, the requested fifth data.

3. The method of claim 2, wherein the first source is a file server and the second source is a database server.

4. The method of claim 1, wherein the first transformation comprises a filter.

5. The method of claim 1, wherein the first transformation comprises a projection.

6. The method of claim 1, wherein:
the first data request comprises a third transformation request for a third transformation;
the first capability information indicates that the first source supports the third transformation;
the generating of the second data request is further based on the third transformation; and
the second data request comprises a fifth request for the third transformation.

7. A device comprising:
a memory that stores instructions; and
one or more processors configured by the instructions to perform operations comprising:
  receiving, from an application, a first data request for first data from a first source, the first data request comprising a transformation request for a first transformation;
  accessing first capability information for the first source, the first capability information indicating that the first source does not support the first transformation;
  based on the first capability information, the first transformation, and the first data request, generating a second data request to the first source for second data;
  receiving, via a network and in response to the second data request, the second data;
  performing the first transformation on the second data to generate the requested first data;
  providing, to the application, a response to the first data request, the response comprising the requested first data;
  receiving, from the application, a third data request for third data from a second source, the third data request comprising a second transformation request for a second transformation;
  accessing second capability information for the second source, the second capability information indicating that the second source supports the second transformation;
  based on the second capability information, the second transformation, the third data request, and a determination that requesting the second source to perform the requested second transformation would increase net consumption of computing resources, generating a fourth data request to the second source for fourth data, the fourth data request not comprising a fourth transformation request for the second transformation;
  receiving, via the network and in response to the fourth data request, the fourth data;
  performing the second transformation on the fourth data to generate the requested third data; and
  providing, to the application, the requested third data.

8. The device of claim 7, wherein the operations further comprise:
receiving, from the application, a fifth data request for fifth data from a third source, the fifth data request comprising a third transformation request for a third transformation;
accessing third capability information for the third source, the third capability information indicating that the third source supports the third transformation;
based on the third capability information, the third transformation, and the fifth data request, generating a sixth data request to the third source for the fifth data, the sixth data request comprising the third transformation; and
providing, to the application, the requested fifth data.

9. The device of claim 8, wherein the first source is a file server and the second source is a database server.

10. The device of claim 7, wherein the first transformation comprises a filter.

11. The device of claim 7, wherein the first transformation comprises a projection.

12. The device of claim 7, wherein:
the first data request comprises a third transformation request for a third transformation;
the first capability information indicates that the first source supports the third transformation;
the generating of the second data request is further based on the third transformation; and
the second data request comprises a fifth request for the third transformation.

13. A non-transitory computer-readable medium that stores instructions that, when executed by one or more processors of a device, cause the one or more processors to perform operations comprising:
receiving, from an application, a first data request for first data from a first source, the first data request comprising a transformation request for a first transformation;
accessing first capability information for the first source, the first capability information indicating that the first source does not support the first transformation;
based on the first capability information, the first transformation, and the first data request, generating a second data request to the first source for second data;
receiving, via a network and in response to the second data request, the second data;
performing the first transformation on the second data to generate the requested first data;
providing, to the application, a response to the first data request, the response comprising the requested first data;
receiving, from the application, a third data request for third data from a second source, the third data request comprising a second transformation request for a second transformation;
accessing second capability information for the second source, the second capability information indicating that the second source supports the second transformation;

based on the second capability information, the second transformation, the third data request, and a determination that requesting the second source to perform the requested second transformation would increase net consumption of computing resources, generating a fourth data request to the second source for fourth data, the fourth data request not comprising a fourth transformation request for the second transformation;

receiving, via the network and in response to the fourth data request, the fourth data;

performing the second transformation on the fourth data to generate the requested third data; and providing, to the application, the requested third data.

14. The non-transitory computer-readable medium of claim 13, wherein the operations further comprise:

receiving, from the application, a fifth data request for fifth data from a third source, the fifth data request comprising a third transformation request for a third transformation;

accessing third capability information for the third source, the third capability information indicating that the third source supports the third transformation;

based on the third capability information, the third transformation, and the fifth data request, generating a sixth data request to the third source for the fifth data, the sixth data request comprising the third transformation; and providing, to the application, the requested third fifth data.

15. The non-transitory computer-readable medium of claim 13, wherein the first transformation comprises a filter.

16. The non-transitory computer-readable medium of claim 13, wherein the first transformation comprises a projection.

17. The non-transitory computer-readable medium of claim 13, wherein:

the first data request comprises a third transformation request for a third transformation;

the first capability information indicates that the first source supports the third transformation;

the generating of the second data request is further based on the third transformation; and the second data request comprises a fifth request for the third transformation.

18. The non-transitory computer-readable medium of claim 13, wherein the first source is a file server and the second source is a database server.

19. The device of claim 7, wherein the application is running on the device.

20. The method of claim 1, wherein the receiving of the first data request is performed by a data access sidecar.

* * * * *